(12) United States Patent  
Amsterdam et al.

(10) Patent No.: US 8,988,428 B2
(45) Date of Patent: Mar. 24, 2015

(54) REPRESENTING A MOVING OBJECT IN A THREE-DIMENSIONAL COORDINATE SYSTEM

(71) Applicant: International Business Machines Corporation, Armonk, NY (US)

(72) Inventors: Jeffrey D. Amsterdam, Marietta, GA (US); William C. Freeman, Marietta, GA (US); William D. Morgan, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/153,506

(22) Filed: Jan. 13, 2014

(65) Prior Publication Data

US 2014/0125662 A1   May 8, 2014

Related U.S. Application Data

(63) Continuation of application No. 13/772,565, filed on Feb. 21, 2013, now Pat. No. 8,669,978, which is a continuation of application No. 11/678,102, filed on Feb. 23, 2007, now Pat. No. 8,405,661.

(51) Int. Cl.
 *G06T 15/00* (2011.01)
 *G06T 19/00* (2011.01)
 *G06T 13/20* (2011.01)
 *G06T 17/20* (2006.01)

(52) U.S. Cl.
 CPC .............. *G06T 19/003* (2013.01); *G06T 13/20* (2013.01); *G06T 17/20* (2013.01)
 USPC .......................................... 345/419; 345/423

(58) Field of Classification Search
 USPC ................................................ 345/419, 423
 See application file for complete search history.

(56) References Cited

U.S. PATENT DOCUMENTS

| | | |
|---|---|---|
| 2002/0181741 A1 | 12/2002 | Masukura et al. |
| 2005/0140678 A1 | 6/2005 | Gielis et al. |
| 2006/0053150 A1 | 3/2006 | Taguchi et al. |

OTHER PUBLICATIONS

Bonamico et al., A System for Real-Time Synthesis of Subtle Expressivity for Life-like MPEG-4 based Virtual Characters, IEEE 6th Workshop on Multimedia Signal Processing; pp. 55-58 (2004).
Notice of Allowance (Mail Date Nov. 19, 2012) for U.S. Appl. No. 11/678,102, filed Feb. 23, 2007, First Named Inventor Jeffrey David Amsterdam.

(Continued)

*Primary Examiner* — Maurice L McDowell, Jr.
(74) *Attorney, Agent, or Firm* — Schmeiser, Olsen & Watts, LLP; Matthew Chung

(57) ABSTRACT

A method for representing a moving object as it moves along a path in a three-dimensional coordinate system. A processor determines a direction of an animated motion of a three-dimensional object moving along a path from a starting location to a second location. The processor draws pairs of vectors from the starting location by performing a series of mathematical functions, where the tips of each pair of vectors identify two points of a three-dimensional mesh, and where the mathematical functions are functions of the starting location, of the location of a point on the object when the object is at the second location, and of the direction of motion of the object along the path. The processor further adjusts characteristics of the mesh and determines, as a function of the adjusted mesh, a characteristic of the animated object, such as its orientation in space, at the second location.

20 Claims, 11 Drawing Sheets

(56) References Cited

OTHER PUBLICATIONS

Notice of Allowance (Mail Date Oct. 18, 2013) for U.S. Appl. No. 13/772,565, filed Feb. 21, 2013, First Named Inventor Jeffrey D. Amsterdam.
Office Action (Mail Date Jul. 8, 2013) for U.S. Appl. No. 13/772,565, filed Feb. 21, 2013, First Named Inventor Jeffrey D. Amsterdam.
Response (Sep. 27, 2013) for U.S. Appl. No. 13/772,565, filed Feb. 21, 2013, First Named Inventor Jeffrey D. Amsterdam.
U.S. Appl. No. 14/155,832, filed Jan. 15, 2014, First Named Inventor Jeffrey D. Amsterdam.
U.S. Appl. No. 14/603,422, filed Jan. 23, 2015.

```xml
<point>
  <serve player="1">
    <coord t="0" x="1.5134" y="-11.8945" z="2.93813" />
    <coord t="0.025" x="1.25962" y="-10.7336" z="2.80191" />
    <coord t="0.05" x="1.014" y="-9.59381" z="2.66109" />
    <coord t="0.075" x="0.776343" y="-8.47501" z="2.51572" />
    <coord t="0.1" x="0.54648" y="-7.37587" z="2.36583" />
    <coord t="0.125" x="0.324223" y="-6.29914" z="2.21144" />
    <coord t="0.15" x="0.10939" y="-5.24156" z="2.05261" />
    <coord t="0.175" x="-0.0982007" y="-4.20384" z="1.88935" />
    <coord t="0.2" x="-0.298733" y="-3.18573" z="1.72171" />
    <coord t="0.225" x="-0.492399" y="-2.18697" z="1.54972" />
    <coord t="0.25" x="-0.679352" y="-1.20728" z="1.37342" />
    <coord t="0.275" x="-0.859803" y="-0.246405" z="1.19283" />
    <coord t="0.3" x="-1.03393" y="0.695925" z="1.00801" />
    <coord t="0.325" x="-1.2019" y="1.61998" z="0.818966" />
    <coord t="0.35" x="-1.36392" y="2.52601" z="0.625751" />
    <coord t="0.375" x="-1.52015" y="3.4143" z="0.428395" />
    <coord t="0.4" x="-1.67079" y="4.28511" z="0.226932" />
    <coord t="0.423602" x="-1.80802" y="5.0914" z="0.033" />
    <coord t="0.425" x="-1.81268" y="5.12054" z="0.033" />
    <coord t="0.427582" x="-1.82128" y="5.17435" z="0.033" />
    <coord t="0.45" x="-1.9132" y="5.7401" z="0.177515" />
    <coord t="0.475" x="-2.01261" y="6.36243" z="0.328053" />
    <coord t="0.5" x="-2.10877" y="6.97571" z="0.467392" />
    <coord t="0.525" x="-2.20167" y="7.57995" z="0.595531" />
    <coord t="0.55" x="-2.2913" y="8.17514" z="0.71247" />
    <coord t="0.575" x="-2.37768" y="8.76128" z="0.818209" />
    <coord t="0.6" x="-2.46081" y="9.33838" z="0.912748" />
    <coord t="0.625" x="-2.54067" y="9.90643" z="0.996097" />
    <coord t="0.65" x="-2.61727" y="10.4654" z="1.06823" />
    <coord t="0.675" x="-2.69062" y="11.0154" z="1.12917" />
    <coord t="0.7" x="-2.76071" y="11.5563" z="1.17891" />
    <coord t="0.725" x="-2.82753" y="12.0882" z="1.21744" />
  </serve>
  <shot>
    <coord t="0.75" x="-2.8679" y="12.486" z="1.24994" />
    <coord t="0.775" x="-2.7394" y="11.9784" z="1.31208" />
    <coord t="0.8" x="-2.61189" y="11.4766" z="1.36939" />
    <coord t="0.825" x="-2.48537" y="10.9906" z="1.42187" />
    <coord t="0.85" x="-2.35984" y="10.4903" z="1.46955" />
    <coord t="0.875" x="-2.23532" y="10.0055" z="1.51245" />
    <coord t="0.9" x="-2.11181" y="9.52627" z="1.5506" />
    <coord t="0.925" x="-1.9893" y="9.05238" z="1.58403" />
    <coord t="0.95" x="-1.8678" y="8.58379" z="1.61274" />
    <coord t="0.975" x="-1.74733" y="8.12041" z="1.63673" />
    <coord t="1" x="-1.62787" y="7.66215" z="1.65615" />
    <coord t="1.025" x="-1.50945" y="7.20891" z="1.67089" />
    <coord t="1.05" x="-1.39205" y="6.76061" z="1.68102" />
    <coord t="1.075" x="-1.27569" y="6.31714" z="1.68656" />
    <coord t="1.1" x="-1.16037" y="5.87843" z="1.68753" />
    <coord t="1.125" x="-1.04609" y="5.44437" z="1.68397" />
    <coord t="1.15" x="-0.932853" y="5.01488" z="1.67588" />
```

FIG. 2a

```
<coord t="1.15" x="-0.932853" y="5.01488" z="1.67588" />
<coord t="1.175" x="-0.820672" y="4.58987" z="1.6633" />
<coord t="1.2" x="-0.709546" y="4.16924" z="1.64624" />
<coord t="1.225" x="-0.59948" y="3.7629" z="1.62474" />
<coord t="1.25" x="-0.490479" y="3.34076" z="1.59881" />
<coord t="1.275" x="-0.382545" y="2.93273" z="1.56849" />
<coord t="1.3" x="-0.275684" y="2.52872" z="1.53378" />
<coord t="1.325" x="-0.1699" y="2.12863" z="1.49472" />
<coord t="1.35" x="-0.0651967" y="1.73238" z="1.45132" />
<coord t="1.375" x="0.0384218" y="1.33986" z="1.40362" />
<coord t="1.4" x="0.140951" y="0.951" z="1.35164" />
<coord t="1.425" x="0.242387" y="0.565697" z="1.29539" />
<coord t="1.45" x="0.342725" y="0.18386" z="1.2349" />
<coord t="1.475" x="0.441962" y="-0.194601" z="1.1702" />
<coord t="1.5" x="0.540092" y="-0.569778" z="1.10131" />
<coord t="1.525" x="0.637112" y="-0.941764" z="1.02825" />
<coord t="1.55" x="0.733018" y="-1.31065" z="0.951051" />
<coord t="1.575" x="0.827806" y="-1.67652" z="0.869728" />
<coord t="1.6" x="0.92147" y="-2.03948" z="0.784306" />
<coord t="1.625" x="1.01401" y="-2.39961" z="0.69481" />
<coord t="1.65" x="1.10541" y="-2.75701" z="0.601264" />
<coord t="1.675" x="1.19569" y="-3.11177" z="0.50369" />

<coord t="1.7" x="1.28482" y="-3.46398" z="0.402112" />
<coord t="1.725" x="1.37281" y="-3.81372" z="0.296554" />
<coord t="1.75" x="1.45965" y="-4.1611" z="0.187038" />
<coord t="1.775" x="1.54533" y="-4.5062" z="0.0735887" />
<coord t="1.78374" x="1.57502" y="-4.62634" z="0.033" />
<coord t="1.8" x="1.61048" y="-4.76911" z="0.0716155" />
<coord t="1.825" x="1.66205" y="-4.98892" z="0.158665" />
<coord t="1.85" x="1.71227" y="-5.20356" z="0.238849" />
<coord t="1.875" x="1.76127" y="-5.41358" z="0.31219" />
<coord t="1.9" x="1.80918" y="-5.61953" z="0.37871" />
<coord t="1.925" x="1.85614" y="-5.82198" z="0.438431" />
<coord t="1.95" x="1.90226" y="-6.02148" z="0.491376" />
<coord t="1.975" x="1.94769" y="-6.21858" z="0.537567" />
<coord t="2" x="1.99256" y="-6.41385" z="0.577027" />
<coord t="2.025" x="2.03698" y="-6.60785" z="0.609777" />
<coord t="2.05" x="2.0811" y="-6.80111" z="0.63584" />
<coord t="2.075" x="2.12504" y="-6.99421" z="0.655239" />
<coord t="2.1" x="2.16894" y="-7.1877" z="0.667996" />
<coord t="2.125" x="2.21292" y="-7.38214" z="0.674132" />
<coord t="2.15" x="2.25711" y="-7.57808" z="0.673671" />
<coord t="2.175" x="2.30165" y="-7.77608" z="0.666634" />
<coord t="2.2" x="2.34667" y="-7.97669" z="0.653045" />
<coord t="2.225" x="2.39229" y="-8.18048" z="0.632925" />
<coord t="2.25" x="2.43864" y="-8.38799" z="0.606296" />
<coord t="2.275" x="2.48586" y="-8.59979" z="0.573181" />
</shot>
</point>
```

FIG. 2b

VECTOR $c = b - a$

VECTOR $v1 = \dfrac{p \times q}{\|p \times q\|}$

VECTOR $v3 = \dfrac{q \times p}{\|q \times p\|}$

REPRESENTING A MOVING OBJECT IN A THREE-DIMENSIONAL COORDINATE SYSTEM

This application is a continuation application claiming priority to Ser. No. 13/772,565, filed Feb. 21, 2013, which is a continuation application to Ser. No. 11/678,102, filed Feb. 23, 2007, now U.S. Pat. No. 8,405,661, issued Mar. 26, 2013.

FIELD OF THE INVENTION

The present invention discloses a method for modeling and animating object trajectories in three-dimensional space.

BACKGROUND OF THE INVENTION

Conventional methods for modeling and animating object trajectories in three-dimensional (3D) space cannot create an accurate and dynamic object trajectory in real-time. Conventional 3D animating methods attempt to animate an object trajectory by displaying a number of discrete objects over time along the trajectory. Consequently, conventional 3D animation methods convey little information as to the object trajectory and may flatten or distort the track of a 3D object as the 3D object is animated along with the object trajectory if there is a sudden change in the direction of the object trajectory as in arcing or and/or swerving.

Thus, there is a need for a method that overcomes at least one of the preceding disadvantages of conventional 3D modeling and animation methods.

SUMMARY OF THE INVENTION

The present invention provides a method for modeling and animating a trajectory of an object in a three-dimensional (3D) space, the object moving along the trajectory with unidirectionally progressing time, wherein said 3D space is specified by an origin O (0, 0, 0) and an XYZ coordinate system comprising an x-axis, a y-axis, and a z-axis, wherein a 3D point comprises a triplet (x, y, z) indicating a position of the object in the 3D space, x representing a distance of the position along the x-axis, y representing a distance of the position along the y-axis, and z representing a distance of the position along the z-axis, wherein the trajectory comprises at least one course, each course being displayed as a 3D model mesh comprising multiple vertices, wherein said each course comprises at least one segment representing a display unit of the 3D model mesh, wherein each segment comprises two 3D points ordered in time and successive segments ordered in time in accordance with said unidirectionally progressing time, said method comprising for each segment:

generating at least three vertices for a first 3D point of said two 3D points comprising the segment, said at least three vertices not being collinear so that said at least three vertices jointly specify a plane such that a normal vector of the specified plane is parallel to a vector directed from the first 3D point of the segment to a second 3D point of the segment; and adding the generated at least three vertices to the 3D model mesh stored in a storage device, so that the generated at least three vertices can be subsequently displayed as an extension of the 3D model mesh.

The present invention provides a computer program product, comprising a computer usable medium having a computer readable program code embodied therein, said computer readable program code containing instructions that when executed by a processor of a computer system implement a method for modeling and animating a trajectory of an object in a three-dimensional (3D) space, the object moving along the trajectory with unidirectionally progressing time, wherein said 3D space is specified by an origin O (0, 0, 0) and an XYZ coordinate system comprising an x-axis, a y-axis, and a z-axis, wherein a 3D point comprises a triplet (x, y, z) indicating a position of the object in the 3D space, x representing a distance of the position along the x-axis, y representing a distance of the position along the y-axis, and z representing a distance of the position along the z-axis, wherein the trajectory comprises at least one course, each course being displayed as a 3D model mesh comprising multiple vertices, wherein said each course comprises at least one segment representing a display unit of the 3D model mesh, wherein each segment comprises two 3D points ordered in time and successive segments ordered in time in accordance with said unidirectionally progressing time, said method comprising for each segment:

generating at least three vertices for a first 3D point of said two 3D points comprising the segment, said at least three vertices not being collinear so that said at least three vertices jointly specify a plane such that a normal vector of the specified plane is parallel to a vector directed from the first 3D point of the segment to a second 3D point of the segment; and adding the generated at least three vertices to the 3D model mesh stored in a storage device, so that the determined at least three vertices can be subsequently displayed as an extension of the 3D model mesh.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for modeling and animating a trajectory of an object in a three-dimensional (3D) space, the object moving along the trajectory with unidirectionally progressing time, wherein said 3D space is specified by an origin O (0, 0, 0) and an XYZ coordinate system comprising an x-axis, a y-axis, and a z-axis, wherein a 3D point comprises a triplet (x, y, z) indicating a position of the object in the 3D space, x representing a distance of the position along the x-axis, y representing a distance of the position along the y-axis, and z representing a distance of the position along the z-axis, wherein the trajectory comprises at least one course, each course being displayed as a 3D model mesh comprising multiple vertices, wherein said each course comprises at least one segment representing a display unit of the 3D model mesh, wherein each segment comprises two 3D points ordered in time and successive segments ordered in time in accordance with said unidirectionally progressing time, said method comprising for each segment:

generating at least three vertices for a first 3D point of said two 3D points comprising the segment, said at least three vertices not being collinear so that said at least three vertices jointly specify a plane such that a normal vector of the specified plane is parallel to a vector directed from the first 3D point of the segment to a second 3D point of the segment; and adding the generated at least three vertices to the 3D model mesh stored in a storage device, so that the determined at least three vertices can be subsequently displayed as an extension of the 3D model mesh.

The present invention provides a method that overcomes at least one of the current disadvantages of conventional methods for modeling and animating object trajectories in 3D space.

BRIEF DESCRIPTION OF THE DRAWINGS

FIGS. 2a and 2b are an example of a trajectory data format, in accordance with embodiments of the present invention.

DETAILED DESCRIPTION OF THE INVENTION

The present invention provides methods for modeling and animating object trajectories in three-dimensional (3D) space. The present invention dynamically and accurately create an object trajectory, and represent the movement of a 3D object without any distortion of a 3D object shape even when the object trajectory arcs and/or swerves.

A position in 3D space is called a 3D point, and an object trajectory is represented by at least two 3D points recorded in time order. The present invention dynamically loads trajectory data comprising at least two 3D points and organizes the loaded trajectory data into individual parts defined as courses. In the present invention, a course means a modeling unit of a trajectory, and each course represents a separate 3D model mesh. A 3D model mesh is a 3D wireframe representing an object trajectory. 3D points created for a 3D model mesh are called vertices, to distinguish a vertex from a 3D position of an object represented by a 3D point. The present invention may independently control display features of each course, separate from other courses in the same trajectory. Each course is animated in real-time. For example, each shot of a rally in a tennis match may be a course within a whole trajectory of a tennis ball. In animating the rally, each shot comprising a course can be displayed in different color, pattern, etc.

To create vertices for a 3D model mesh representing a course, the present invention uses vector mathematics. Using multiple vertices for each recorded 3D point of an object trajectory, the present invention can create 3D model meshes that accurately depict the trajectory. The created 3D model meshes would be dynamically extended in real-time, according to the time frame of the recorded 3D point data.

Figure 1:
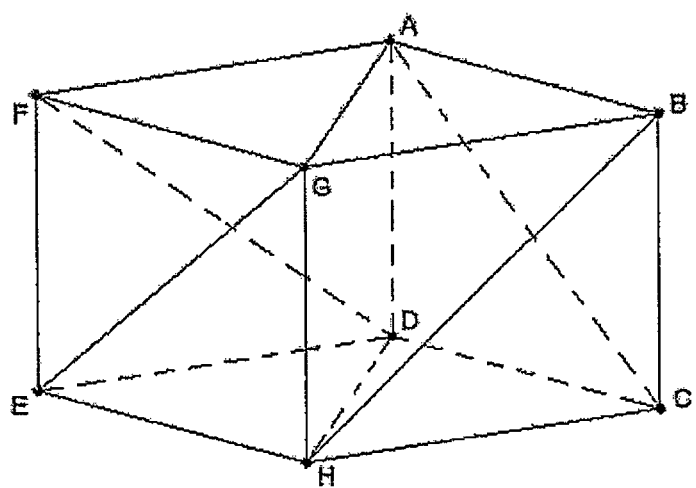
FIG. 1 is an example of a mesh for a three-dimensional (3D) cube, in accordance with embodiments of the present invention.

FIG. 1 is an example mesh for a 3D cube, in accordance with the embodiments of the present invention. A, B, C, D, E, F, G and H are vertices of the mesh. The term "vertex" means a 3D point on a 3D model mesh in the present invention. A 3D point is a three-dimensional (3D) point located at position designated by a triplet (x, y, z) in an XYZ coordinate system. Three non-collinear vertices can define a two-dimensional (2D) triangular surface, and such a surface which is defined by at least three vertices is a "face." Triangles ABC, ACD, ADF, DEF, EFG, EGH, BGH, BCH, ABG, AFG, CDH, and DEH are faces of the example mesh. A "mesh" is a wireframe of a three-dimensional (3D) object which is defined by a set of vertices and faces defined by the set of vertices.

In conventional 3D modeling, most 3D objects are static and animated by moving these static objects. 3D model meshes for an object trajectory may be dynamically created by the methods of present invention by dynamically defining vertices which form a 3D model mesh. Newly defined vertices will be added to a 3D model mesh according to the movement of an object, and the 3D model mesh will be extended as vertices are created by the methods of present invention.

FIGS. 2a and 2b are an example of a trajectory data format, in accordance with embodiments of the present invention.

The example is provided as a node in Extensible Markup Language (XML) format. The XML file contains nodes for each discrete part of the trajectory, which may be modeled as a separate 3D model mesh. As described earlier, each discrete part of whole trajectory may comprise a course. The example XML data has nodes to delineate each course. Separate courses are represented by a <shot> . . . </shot> and <serve> . . . </serve> tags in FIGS. 2a and 2b. A <coord> tag has attributes defining each data point within each of these nodes. "t" is a time element of the data point, "x" is the position of the data point along the x-axis, "y" is the position of the data point along the y-axis, and "z" is the position of the data point along the z-axis. Each <coord> node represents a position of an object at given time. Thus, a data point is displayed at (x, y, z) position on time t. In the first data point, the initial position of an object is the node with t="0," and t is increased by 0.025 in successive nodes until t="0.4." The time interval between successive nodes may be variable, as shown in nodes with t="0.4," t="0.423602," t="0.425," t="0.427582," t="0.45," etc.

Figure 3:
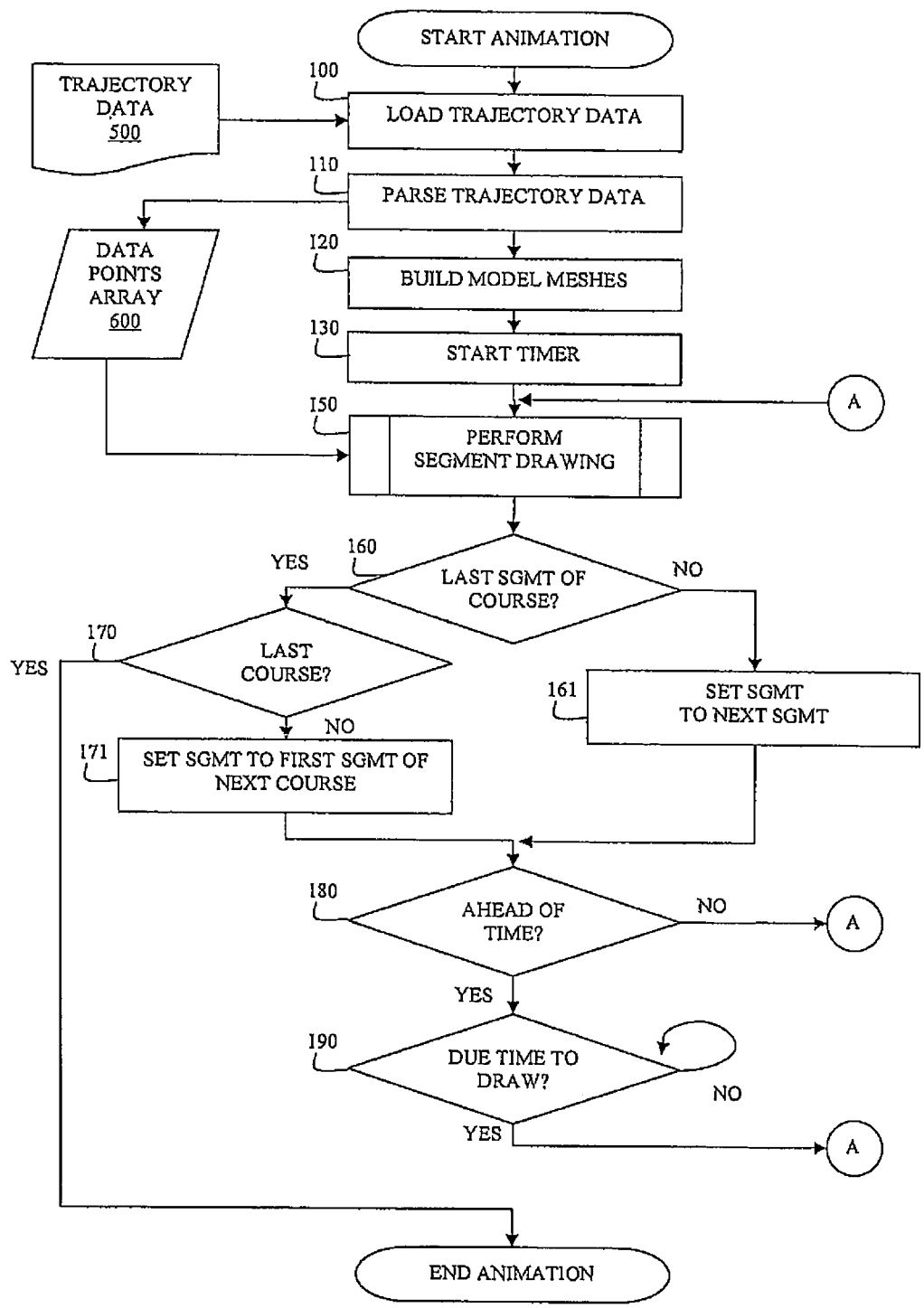
FIG. 3 is a flow chart depicting a method for modeling and animating object trajectories in 3D space, in accordance with embodiments of the present invention.

FIG. 3 is a flow chart depicting a method for modeling and animating object trajectories in 3D space, in accordance with embodiments of the present invention.

A 3D object trajectory comprises at least one course, and each course may be displayed as a 3D model mesh comprising multiple vertices. Each course comprises at least one segment representing a display unit of the 3D model mesh. Each segment comprises two 3D points ordered in time and successive segments are ordered in time with the same direction as the direction of two 3D points within a segment.

In step 100, the animation process loads trajectory data from a trajectory data file 500. Trajectory data are formatted as shown in FIGS. 2a and 2b supra. Trajectory data comprises at least two nodes representing a segment. Each node comprises a 3D position and a time value to display the 3D position.

In step 110, the animation process parses the loaded trajectory data 500. The animation process goes through each course which is a part of the trajectory, checks for errors, and adds points to each discrete course in order to create smooth transitions in the final animation. A beginning data point of a course should be commonly positioned with an ending data point of an immediately preceding course so that two 3D model meshes of two consecutive courses can be seamlessly displayed. Sometimes trajectory data may not be timely ordered throughout the courses so the animation process should move such a displaced data point to the correct course during error checking. This repositioning is specific to certain types of objects being recorded and how the trajectory is subdivided into courses.

The animation process stores the parsed trajectory data as a data points array 600 for the use by the segment drawing process in step 150 infra. Each data point comprises a 3D point (x, y, z) and a data time t, wherein (x, y, z) represents a 3D position in an XYZ coordinate system with x as an x coordinate, y as a y coordinate, and z as a z coordinate, and t represents the time to display the 3D point on (x, y, z) position.

In step 120, the animation process builds a separate 3D model mesh for each course comprising the trajectory which is being modeled. Each course with a separate 3D model mesh may be individually controlled so that it can be displayed with different display features such as color, animation, etc. Initial position of all vertices in each mesh is (0, 0, 0). Because all vertices of a 3D model mesh are located at the origin of an XYZ coordinate system, the 3D model mesh is initially invisible in the 3D space. Each 3D point of a segment has at least two vectors for the 3D point, and tips of vectors are vertices of a 3D model mesh which is animated. When there are only two vectors, the 3D point specifying the position of an object may as well be a vertex for the 3D model mesh. The vectors are also initially set onto the origin O (0, 0, 0). The vectors will be calculated and drawn in the segment drawing process infra of step 150. After the segment drawing process calculates vectors for each 3D point of a segment of a course, the 3D model mesh is displayed.

In step 130, the animation process starts a timer to measure current time, which represents the lapse of time since the timer started. Current time is compared with data time t value of a data point to control the segment drawing process as shown in steps 180 and 190 infra.

In step 150, the animation process performs drawing of a segment by invoking a predefined segment drawing process which is described in FIG. 5 infra. The segment drawing process draws a segment with a beginning and an ending data points from the data points array 600. The segment drawing process is separated from the animation process for the purpose of modularized and simplified process control, and may be integrated into the animation process if necessary.

In step 160, the animation process determines whether the segment drawn in step 150 is the last segment of the course. Note that a trajectory comprises at least one course, and each course comprises at least one segment, and a segment is a unit trajectory from one data point to the next data point. If the segment drawn in step 150 is not the last segment of a course, the animation process sets an immediately succeeding segment in the same course for drawing in step 161. If the animation process determines that the segment is the last segment of the course, the animation process determines whether the course having the segment drawn in step 150 is the last course of the trajectory in step 170. If the animation process determines that the course having the segment drawn in step 150 is not the last course of the trajectory, the animation process sets the first segment of an immediately succeeding course for drawing in step 171. If the animation process determines that the course of the segment drawn in step 150 is the last course of the trajectory in step 170, the animation process terminates because the entire trajectory has been drawn.

In step 180, the animation process compares current time with segment time of the next segment determined in steps 160, 161, 170, and 171 supra. The segment time is the data time of an ending data point for a segment. The current time may be, inter alia, updated by synchronizing with a system clock, etc. If the data time of a segment is less than or equal to the current time, indicating that the time for drawing the segment has already passed, the segment is immediately drawn by the segment drawing procedure in step 150.

If the animation process determines that the data time of the segment to be drawn is greater than the current time in step 180, indicating that the time for drawing the segment has not reached yet, then the animation process waits until the current time becomes equal to the data time of the segment in step 190 at which time the segment drawing is performed followed by looping back to step 150.

Step 190 is periodically performed by examining data time of a successive data point at every predefined examination interval. A data collection interval represents the difference of data time between two consecutive data points. By periodically examining data time, an object trajectory could be smoothly and seamlessly animated in real-time. As described in FIGS. 2*a* and 2*b* supra, the increment in data time between two consecutive data points may vary. Consequently, the predefined examination interval for the animation process examining the data time of a data point may be greater than actual data collection interval between two consecutive data points. Where the current time is greater than the data time of more than one data points, the animation process can simultaneously display more than one successive data point. In cases of simultaneous drawing of multiple data points, resulting animation of the object trajectory would be uneven and/or irregular. Although the animation process may not maintain the pace of the predefined examination interval, the method of present invention can still animate accurate object trajectory in real-time.

Figure 4:
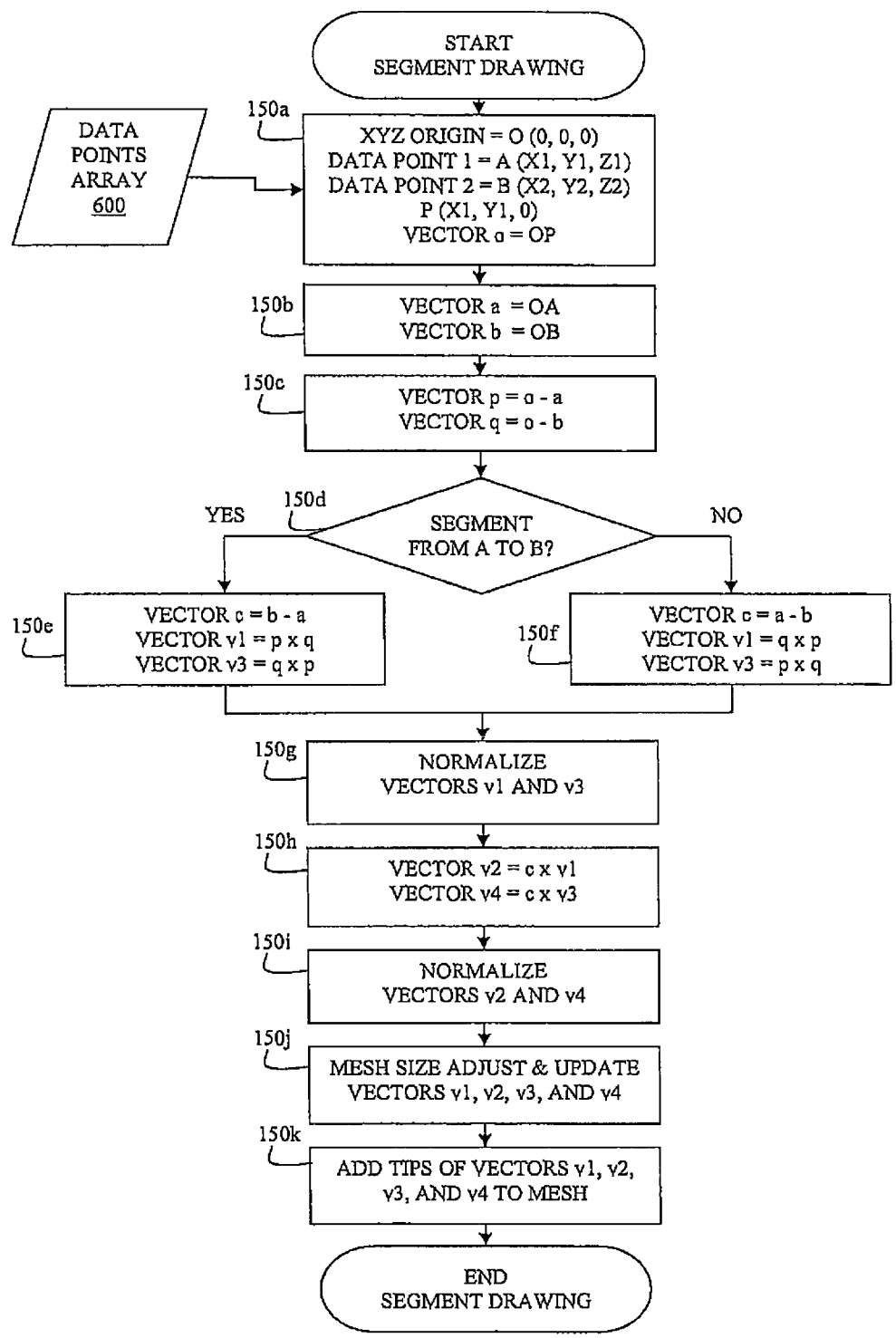
FIG. 4 is a flow chart depicting a method for drawing a segment of an object trajectory in 3D space, in accordance with embodiments of the present invention.

FIG. 4 is a flow chart depicting a method for drawing a segment of an object trajectory in 3D space, in accordance with embodiments of the present invention.

Figure 6:
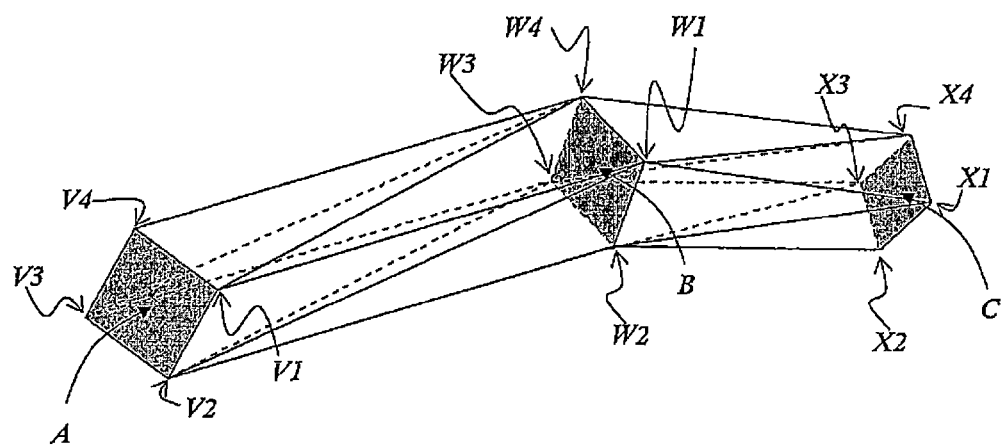
FIG. 6 illustrates an example 3D model mesh created for an object trajectory, in accordance with embodiments of the present invention.

In one embodiment of the present invention, the animation process may specify a 2D plane to extend the 3D model mesh by generating two vertices from an original 3D point of the segment and using the original 3D point as the third point. In another embodiment, as shown in FIG. 6 infra, the animation process may specify a 2D plane to extend the 3D model mesh by generating three or more vertices around a 3D point of a segment and using only the generated vertices.

Where recorded data points for a 3D object trajectory define only one 3D position for each point in time, the single data point by itself can not form a 3D model mesh representing a 3D object trajectory. Multiple vertices per data point are necessary in order to provide depth, height and width to the 3D model mesh so that the 3D model mesh can be three-dimensionally displayed. The flow chart of FIG. 4 describes the process of calculating four vertices with 3D points for each data point of a segment to form a 3D model mesh for an object trajectory from the beginning data point to an ending data point.

To actually make each successive part of a 3D model mesh visible, the segment drawing process takes two data points. Any two consecutive data points may form a segment for the segment drawing process. With a beginning data point and an ending data point of the segment in 3D space and vector math, the segment drawing process generates at least two new vertices around each recorded data point. By creating multiple vertices for each 3D point and adding these vertices to all the 3D model mesh, a 3D object with height, width and depth may be displayed. By repeating the segment drawing process on all data points in the data point array 600, all data points may be three-dimensionally displayed with generated vertices for each data point. Adding vertices to the 3D model mesh has the visual effect of extending an existing 3D model mesh along the trajectory.

In step 150*a*, the drawing process identifies two consecutive data points A (x1, y1, z1) and B (x2, y2, z2) in the data points array as a segment of an object trajectory. The data points exist in a single XYZ coordinate system. The origin O of the XYZ coordinate system is located at (0, 0, 0). A 3D point P is located at (x1, y1, 0) where data point A is projected onto XY plane. Vector o is specified as a vector from the origin O (0, 0, 0) to the projected point P (x1, y1, 0).

Figure 5A:
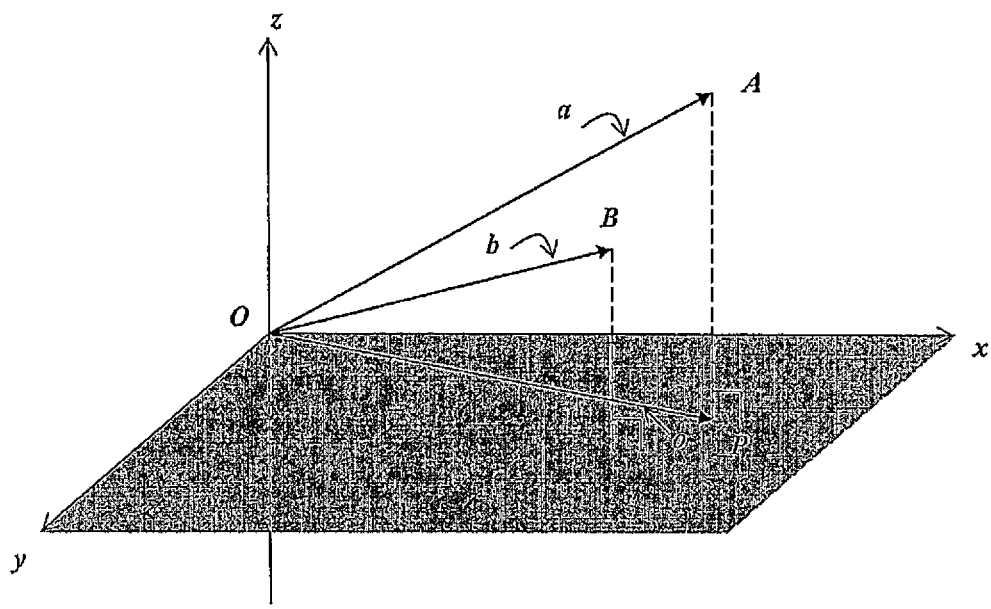
FIGS. 5a, 5b, 5c, and 5d represent steps of the method for drawing a segment in FIG. 4, supra, in accordance with embodiments of the present invention.

In step 150*b*, the drawing process specifies vector a and vector b. Vector a is a vector from the origin O (0, 0, 0) to data point A (x1, y1, z1). Vector b is a vector from the origin O (0, 0, 0) to data point B (x2, y2, z2). FIG. 5*a* illustrates data points O, A, B, and P and vectors o, a, and b.

Figure 5B:
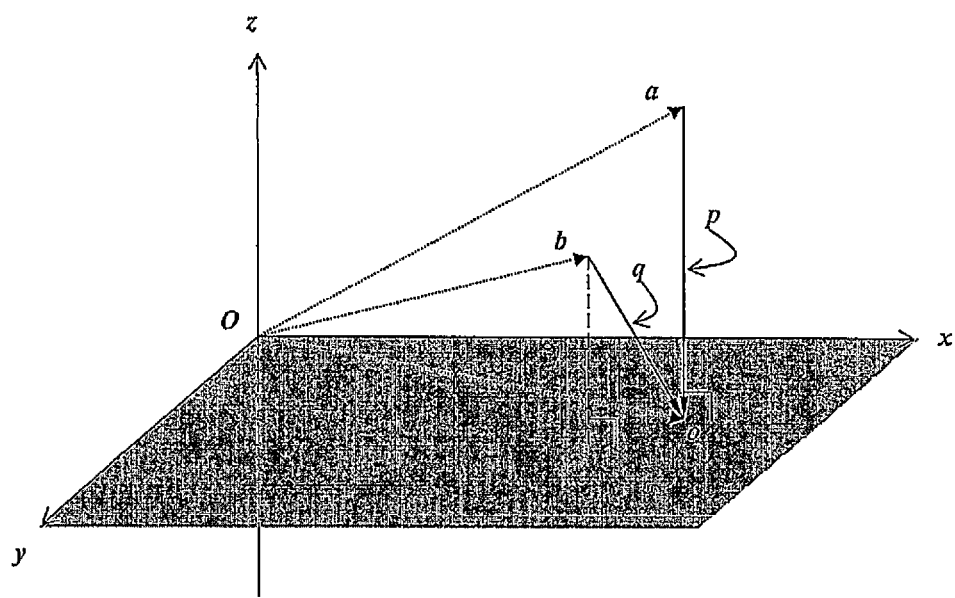

In step 150*c*, vector p is specified as vector subtraction of vector a from vector o; i.e., (o–a), and vector q is specified as vector subtraction of vector b from vector o; i.e., (o–b). FIG. 5*b* depicts vectors p and q over FIG. 5*a*.

In step 150*d*, the segment drawing process determines the direction of the segment being drawn. If the segment is being drawn from data point A to data point B, the segment drawing process sets A as a beginning point and B as an ending point, then proceeds with step 150*e*. In step 150*e*, vector c is specified as vector subtraction of vector a from vector b; i.e., (b–a). Vector v1 specified as vector cross product of vector p and vector q; i.e., (p×q). Vector v3 is specified as vector cross product of vector q and vector p; i.e., (q×p). If the determination in step 150*d* is that the segment being drawn is from data point B to data point A, the segment drawing process sets B as a beginning point and A as an ending point, then proceeds with step 150*f*. In step 150*f*, vector c is specified as vector subtraction of vector b from vector a (a–b), which is directed opposite to the vector c specified in step 150*e*. Vector v1 is specified as vector cross product of vector q and vector p; i.e., (q×p). Vector v3 specified as vector cross product of vector p and vector q; i.e., (p×q).

Figure 5C:
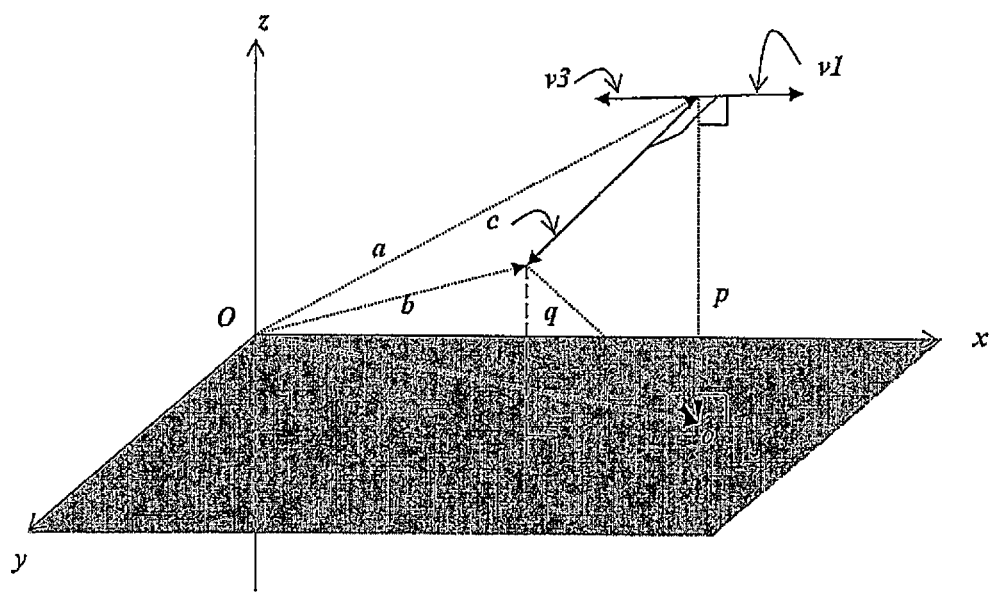

In step 150*g*, vectors v1 and v3 are normalized to unit vectors. FIG. 5*c* illustrates specified vectors c, v1 and v3 after step 150*g* over FIG. 5*b*.

Figure 5D:
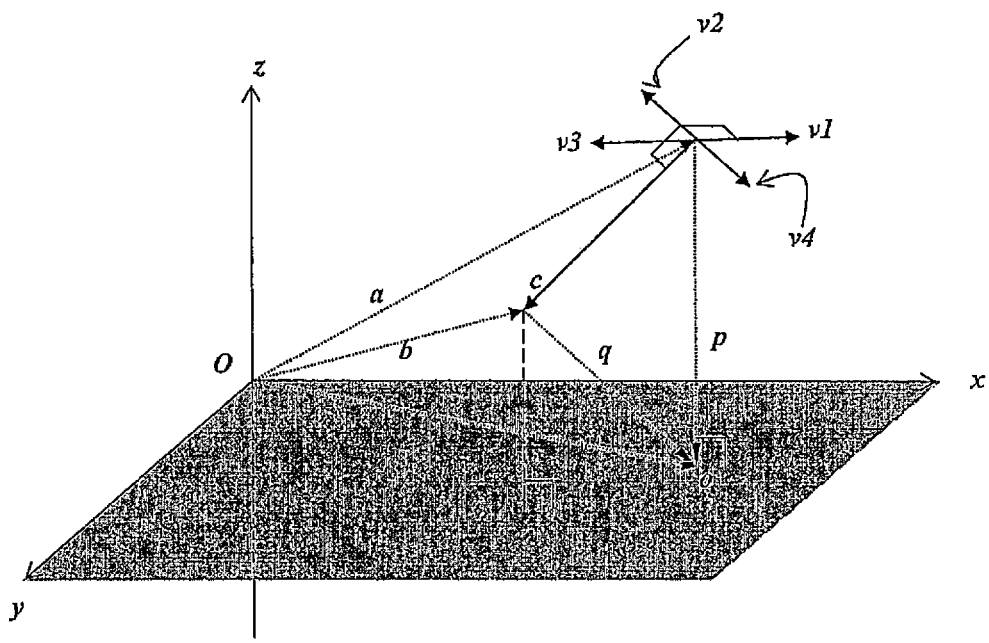

In step 150*h*, vector v2 is specified as vector cross product of vector c and vector v1; i.e., (c×v1). Vector v4 is vector cross product of vector c and v3; i.e., (c×v3). In step 150*i*, vectors v2 and v4 are normalized to unit vectors. FIG. 5*d* illustrates vectors v2 and v4 over FIG. 5*c*.

In step 150*j*, the length of all vectors is adjusted to make the trajectory being modeled to fit for 3D space. A mesh size adjusting factor is multiplied to all unit vectors v1, v2, v3 and v4, to enlarge or reduce the volume of the 3D model mesh for the trajectory. Note that a unit vector may result from multiplying mesh size adjusting factor to a vector prior to the normalizing steps 150*g* and 150*i*. In this embodiment, because the vectors with different lengths were made as unit vectors prior to the size adjusting in step 150*j*, the size of the 3D model mesh may be adjusted by multiplying same mesh size adjusting factor to all vectors. In another embodiment, size adjusting of a 3D model mesh may be applied to vectors without normalization, and mesh size adjusting factor may be different from a vector to another pursuant to the length of the vector being adjusted.

Vector v1 is updated to vector v1 multiplied by a mesh size adjusting factor defined for the trajectory data to match the 3D model mesh and added to vector a. Similarly, vector v2 is updated to vector v2 multiplied by the mesh size adjusting factor and added to vector a, vector v3 is updated to vector v3 multiplied by the mesh size adjusting factor and added to vector a, and vector v4 is updated to vector v4 multiplied by the mesh size adjusting factor and added to vector a.

In step 150*k*, the tips of vectors v1, v2, v3, and v4 are added to the 3D model mesh as additional vertices for the 3D model mesh to be drawn, and an extension of the 3D model mesh corresponding to the segment from the beginning point to the ending point is displayed. Steps 150*a* to 150*k* is repeated for all subsequent data points in each course of the 3D object trajectory until the animation process of FIG. 3 supra is completed.

FIG. 6 illustrates an example 3D model mesh created for an object trajectory, in accordance with embodiments of the present invention.

The segment drawing method described in FIG. 4 supra employs normalization and mesh size adjustment in creating four vertices so that a 3D model mesh has consistent height and width throughout the entire 3D model mesh, resulting in a smoothly animated trajectory. Consequently, even in cases where a trajectory arcs and/or swerves, the present invention does neither flatten nor twist the 3D model mesh being animated. This stable and consistent animation is an advantage over conventional methods for 3D modeling and animation.

In the example, an object passes three points A, B, and C, in that order. Thus, the object has trajectory beginning at point A, extending to point B, and ending in point C. The trajectory has two segments defined by two consecutive points, AB and BC. Initially, a 3D model mesh is created with all vertices set to (0, 0, 0) after step 120 of the animation process described in FIG. 4 supra. In the first execution of the segment drawing method described in FIG. 5 supra, point A is a beginning data point of a segment, and point B is an ending data point of the segment. The data points V1, V2, V3, and V4 are tips of vectors calculated around point A pursuant to the segment drawing method described in FIG. 5 supra, which are added to the 3D model mesh in step 150*k*.

In the second execution of the segment drawing method described in FIG. 5 supra, point B is a beginning data point of a segment, and point C is an ending data point of the segment. The data points W1, W2, W3, and W4 are tips of vectors calculated around point B pursuant to the segment drawing method described in FIG. 5 supra, which are added to the 3D model mesh in step 150*k*. The 3D positions for vertices of the 3D model mesh are updated to these added 3D points. Then the 3D model mesh for the first segment AB, which is specified by vertices V1 V2 V3 V4-W1 W2 W3 W4, is displayed.

In the third execution of the segment drawing method described in FIG. 5 supra, point C is a beginning data point of a segment, and point B is an ending data point of the segment. The data points X1, X2, X3, and X4 are tips of vectors calculated around point C pursuant to the segment drawing method described in FIG. 5 supra, which are added to the 3D model mesh in step 150*k*. The 3D positions for vertices of the 3D model mesh are updated to these added 3D points. Then the 3D model mesh for the second segment BC, which is specified by vertices W1 W2 W3 W4-X1 X2 X3 X4, is displayed. The 3D model mesh is extended along the trajectory path as more data points are added to the mesh. Note that a beginning data point of a segment is designated only for the purpose of calculating vectors around one of two 3D points comprising a segment. The segment would be drawn as the 3D model mesh extends from already existing 3D model mesh toward the newly added vertices.

Figure 7:
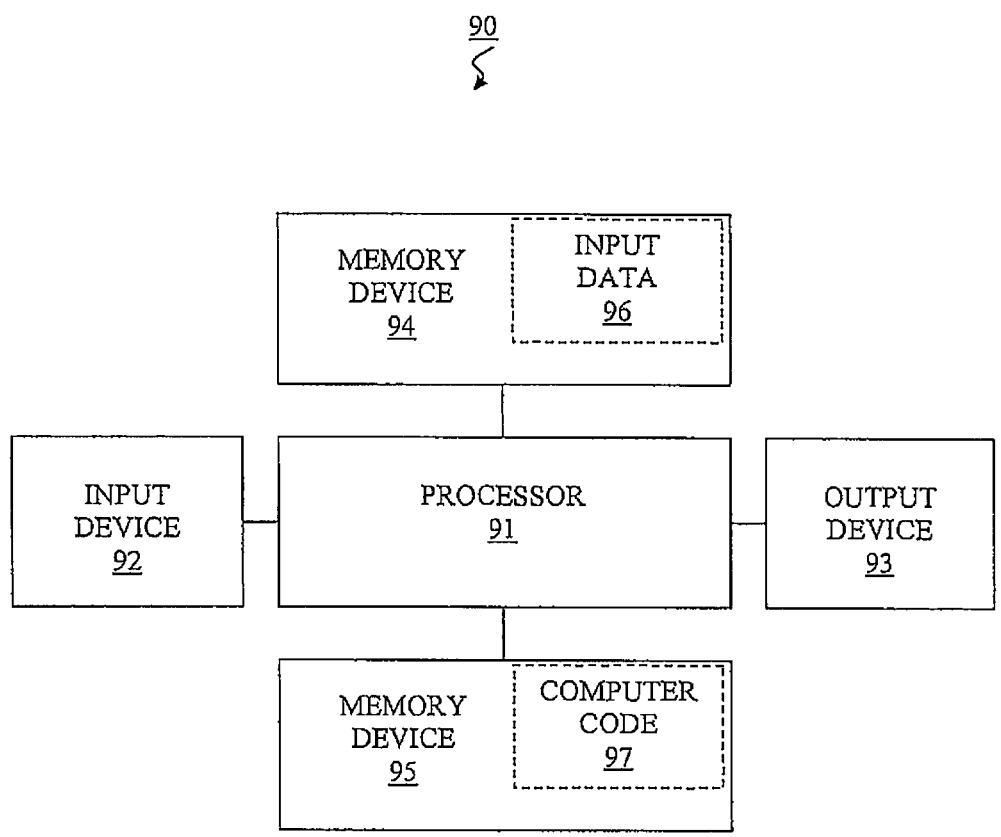
FIG. 7 illustrates a computer system used for modeling and animating object trajectories in 3D space, in accordance with embodiments of the present invention.

FIG. 7 illustrates a computer system 90 used for modeling and animating object trajectories in 3D space, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 is any device capable of providing data input to the computer system 90. Examples of input device may be, inter alia, a keyboard, a mouse, a keypad, a touchscreen, a voice recognition device, a network interface card (NIC), a Voice/video over Internet Protocol (VOIP) adapter, a wireless adapter, a telephone adapter, a dedicated circuit adapter, etc. The output device 93 is any device capable of receiving and/or displaying data output from the computer system 90. Examples of output device may be, inter alia, a printer, a plotter, a computer screen, a magnetic tape, a removable hard disk, a floppy disk, a programmable compact disc (CD), a digital video disc (DVD), a NIC, a VOIP adapter, a wireless adapter, a telephone adapter, a dedicated circuit adapter, etc. The memory devices 94 and 95 may be, inter alia, a cache, a dynamic random access memory (DRAM), a read-only memory (ROM), a hard disk, a floppy disk, a magnetic tape, an optical storage such as a CD or a DVD, etc. The memory device 95 includes a computer code 97 which is a computer program that comprises computer-executable instructions. The computer code 97 includes, inter alia, an algorithm used for modeling and animating object trajectories in 3D space according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for supporting computer infrastructure, integrating, hosting, maintaining, and deploying computer-readable code into the computer system 90, wherein the code in combination with the computer system 90 is capable of performing a method for modeling and animating object trajectories in 3D space.

Any of the components of the present invention could be deployed, managed, serviced, etc. by a service provider who offers to support modeling and animating object trajectories in 3D space. Thus the present invention discloses a process for deploying or integrating computing infrastructure, comprising integrating computer-readable code into the computer system 90, wherein the code in combination with the computer system 90 is capable of performing a method for modeling and animating object trajectories in 3D space.

In another embodiment, the invention provides a business method that performs the process steps of the invention on a subscription, advertising, and/or fee basis. That is, a service provider, such as a Solution Integrator, could offer to support modeling and animating object trajectories in 3D space. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for representing an orientation of an object as it moves along a path in three-dimensional space, wherein the path is comprised of a set of contiguous locations in three-dimensional space, wherein the object is represented as a set of object points in three-dimensional space, wherein a first object point of the set of object points is associated with a first three-dimensional coordinate and with a first time, and wherein a location of the set of contiguous locations is associated with a second three-dimensional coordinate, the method comprising:

a processor of a computer system identifying a starting location of the path, wherein the starting point is comprised by the set of contiguous locations;

the processor associating the object with the starting location;

the processor setting all object points of the set of object points to a same starting location value and to a same starting time;

the processor selecting a second location on the path, wherein the second location is comprised by the set of contiguous locations, and wherein the position of the second location on the path is selected in order to create a smooth transition of the object along the path;

the processor further associating the object with the second location and with a second time; and the processor drawing a set of pairs of vectors, wherein a first pair of vectors of the set of pair of vectors both originate at the starting location value, wherein the coordinates of the tips of the first pair of vectors and the coordinate of the second location identify three vertex points of a three-dimensional wireframe mesh, and wherein the orientation of the object as it moves along the path from the starting location to the second location is a function of the three-dimensional wireframe mesh.

2. The method of claim 1, further comprising:

the processor determining that the direction of the motion of the object along the path is from the starting location to the second location;

the processor revising the 3D wireframe mesh by performing a sequence of mathematical vector operations upon the three-dimensional coordinates of the starting location and of the second location, wherein the revising is a function of the direction of the motion of the object along the path;

the processor specifying a mesh-size adjusting factor as a function of the revising;

the processor adjusting the size of the revised 3D wireframe mesh as a function of the mesh-size adjusting factor; and the processor determining a characteristic of the motion of the object at the second location as a function of the adjusted revised mesh.

3. The method of claim 2, wherein the mathematical vector operations identify the three vertex points as functions of the starting location, the second location, and the direction of the motion along the path.

4. The method of claim 3, wherein the vector operations further comprise:

the processor identifying a point P by projecting the starting point onto a plane in the three-dimensional coordinate system;

the processor identifying a vector o as a vector from an origin point O of the coordinate system to the point P;

the processor identifying a vector a as a vector from the origin point O to the starting location;

the processor identifying a vector b as a vector from the origin point O to the second location;

the processor identifying a vector p as a result of a vector subtraction of the vector a from the vector o;

the processor identifying a vector q as a result of a vector subtraction of the vector b from the vector o;

the processor identifying a vector c as a result of a vector subtraction of the vector a from the vector b;

the processor identifying a vector v1 as a vector cross product of the vector p and the vector q;

the processor identifying a vector v2 as a vector cross product of the vector c and the vector v1;

the processor identifying the first vertex as a vector tip point of a vector sum of the vector a and the vector v1; and the processor identifying the second vertex as a vector tip point of a vector sum of the vector a and the vector v2.

5. The method of claim 4, wherein the vector operations further comprise the processor identifying the third vertex as the starting location.

6. The method of claim 4, wherein the vector operations further comprise:

the processor identifying a vector v3 as a vector cross product of the vector q and the vector p;

the processor identifying a vector v4 as a vector cross product of the vector c and the vector v3; and the processor identifying the third vertex as a vector tip point of a vector sum of the vector a and the vector v3.

7. The method of claim 6, wherein the mesh further comprises a fourth vertex point of the 3D wireframe mesh and wherein the vector operations further comprise the processor identifying the fourth vertex as a three-dimensional coordinate of a vector tip of a vector sum of the vector a and the vector v4.

8. The method of claim 1, further comprising providing at least one support service for at least one of creating, integrating, hosting, maintaining, and deploying computer-readable program code in the computer system, wherein the computer-readable program code in combination with the computer system is configured to implement the identifying, associating, setting, selecting, further associating, and drawing.

9. A computer program product, comprising a computer-readable hardware storage device having a computer-readable program code stored therein, said program code configured to be executed by a processor of a computer system to implement a method for representing an orientation of an object as it moves along a path in three-dimensional space, wherein the path is comprised of a set of contiguous locations in three-dimensional space, wherein the object is represented as a set of object points in three-dimensional space, wherein a first object point of the set of object points is associated with a first three-dimensional coordinate and with a first time, and wherein a location of the set of contiguous locations is associated with a second three-dimensional coordinate, the method comprising:

the processor identifying a starting location of the path, wherein the starting point is comprised by the set of contiguous locations;

the processor associating the object with the starting location;

the processor setting all object points of the set of object points to a same starting location value and to a same starting time;

the processor selecting a second location on the path, wherein the second location is comprised by the set of contiguous locations, and wherein the position of the second location on the path is selected in order to create a smooth transition of the object along the path;

the processor further associating the object with the second location and with a second time; and the processor drawing a set of pairs of vectors, wherein a first pair of vectors of the set of pair of vectors both originate at the starting location value, wherein the coordinates of the tips of the first pair of vectors and the coordinate of the second location identify three vertex points of a three-dimensional wireframe mesh, and wherein the orientation of the object as it moves along the path from the starting location to the second location is a function of the three-dimensional wireframe mesh.

10. The computer program product of claim 9, further comprising:

the processor determining that the direction of the motion of the object along the path is from the starting location to the second location;

the processor revising the 3D wireframe mesh by performing a sequence of mathematical vector operations upon the three-dimensional coordinates of the starting location and of the second location, wherein the revising is a function of the direction of the motion of the object along the path;

the processor specifying a mesh-size adjusting factor as a function of the revising;

the processor adjusting the size of the revised 3D wireframe mesh as a function of the mesh-size adjusting factor; and the processor determining a characteristic of the motion of the object at the second location as a function of the adjusted revised mesh.

11. The computer program product of claim 10, wherein the mathematical vector operations identify the three vertex points as functions of the starting location, the second location, and the direction of the motion along the path.

12. The computer program product of claim 11, wherein the vector operations further comprise:

the processor identifying a point P by projecting the starting point onto a plane in the three-dimensional coordinate system;

the processor identifying a vector o as a vector from an origin point O of the coordinate system to the point P;

the processor identifying a vector a as a vector from the origin point O to the starting location;

the processor identifying a vector b as a vector from the origin point O to the second location;

the processor identifying a vector p as a result of a vector subtraction of the vector a from the vector o;

the processor identifying a vector q as a result of a vector subtraction of the vector b from the vector o;

the processor identifying a vector c as a result of a vector subtraction of the vector a from the vector b;

the processor identifying a vector v1 as a vector cross product of the vector p and the vector q;

the processor identifying a vector v2 as a vector cross product of the vector c and the vector v1;

the processor identifying the first vertex as a vector tip point of a vector sum of the vector a and the vector v1; and the processor identifying the second vertex as a vector tip point of a vector sum of the vector a and the vector v2.

13. The computer program product of claim 12, wherein the vector operations further comprise the processor identifying the third vertex as the starting location.

14. The computer program product of claim 12, wherein the vector operations further comprise:
the processor identifying a vector v3 as a vector cross product of the vector q and the vector p;
the processor identifying a vector v4 as a vector cross product of the vector c and the vector v3; and
the processor identifying the third vertex as a vector tip point of a vector sum of the vector a and the vector v3.

15. The computer program product of claim 14, wherein the mesh further comprises a fourth vertex point of the 3D wireframe mesh and wherein the vector operations further comprise the processor identifying the fourth vertex as a three-dimensional coordinate of a vector tip of a vector sum of the vector a and the vector v4.

16. A computer system comprising a processor, a memory coupled to said processor, and a computer-readable hardware storage device coupled to said processor, said storage device containing program code configured to be run by said processor via the memory to implement a method for representing an orientation of an object as it moves along a path in three-dimensional space, wherein the path is comprised of a set of contiguous locations in three-dimensional space, wherein the object is represented as a set of object points in three-dimensional space, wherein a first object point of the set of object points is associated with a first three-dimensional coordinate and with a first time, and wherein a location of the set of contiguous locations is associated with a second three-dimensional coordinate, the method comprising:
the processor identifying a starting location of the path, wherein the starting point is comprised by the set of contiguous locations;
the processor associating the object with the starting location;
the processor setting all object points of the set of object points to a same starting location value and to a same starting time;
the processor selecting a second location on the path, wherein the second location is comprised by the set of contiguous locations, and wherein the position of the second location on the path is selected in order to create a smooth transition of the object along the path;
the processor further associating the object with the second location and with a second time; and
the processor drawing a set of pairs of vectors, wherein a first pair of vectors of the set of pair of vectors both originate at the starting location value, wherein the coordinates of the tips of the first pair of vectors and the coordinate of the second location identify three vertex points of a three-dimensional wireframe mesh, and wherein the orientation of the object as it moves along the path from the starting location to the second location is a function of the three-dimensional wireframe mesh.

17. The computer system of claim 16, further comprising:
the processor determining that the direction of the motion of the object along the path is from the starting location to the second location;
the processor revising the 3D wireframe mesh by performing a sequence of mathematical vector operations upon the three-dimensional coordinates of the starting location and of the second location, wherein the revising is a function of the direction of the motion of the object along the path;
the processor specifying a mesh-size adjusting factor as a function of the revising;
the processor adjusting the size of the revised 3D wireframe mesh as a function of the mesh-size adjusting factor; and
the processor determining a characteristic of the motion of the object at the second location as a function of the adjusted revised mesh.

18. The computer system of claim 17, wherein the mathematical vector operations identify the three vertex points as functions of the starting location, the second location, and the direction of the motion along the path.

19. The computer system of claim 18, wherein the vector operations further comprise:
the processor identifying a point P by projecting the starting point onto a plane in the three-dimensional coordinate system;
the processor identifying a vector o as a vector from an origin point O of the coordinate system to the point P;
the processor identifying a vector a as a vector from the origin point O to the starting location;
the processor identifying a vector b as a vector from the origin point O to the second location;
the processor identifying a vector p as a result of a vector subtraction of the vector a from the vector o;
the processor identifying a vector q as a result of a vector subtraction of the vector b from the vector o;
the processor identifying a vector c as a result of a vector subtraction of the vector a from the vector b;
the processor identifying a vector v1 as a vector cross product of the vector p and the vector q;
the processor identifying a vector v2 as a vector cross product of the vector c and the vector v1;
the processor identifying the first vertex as a vector tip point of a vector sum of the vector a and the vector v1; and
the processor identifying the second vertex as a vector tip point of a vector sum of the vector a and the vector v2.

20. The computer system of claim 19, wherein the vector operations further comprise:
the processor identifying a vector v3 as a vector cross product of the vector q and the vector p;
the processor identifying a vector v4 as a vector cross product of the vector c and the vector v3; and
the processor identifying the third vertex as a vector tip point of a vector sum of the vector a and the vector v3.

* * * * *